May 18, 1965
J. A. GAYLORD
3,183,568
CANOPY RELEASE
Filed Sept. 17, 1962
3 Sheets-Sheet 1
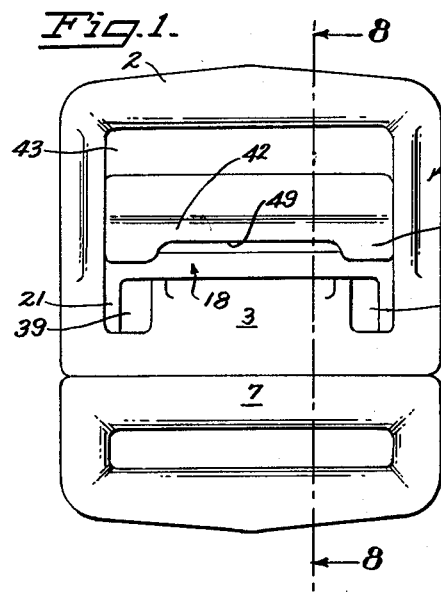
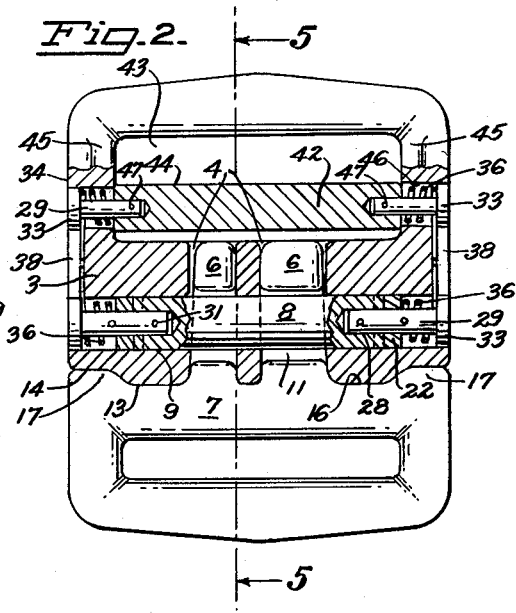
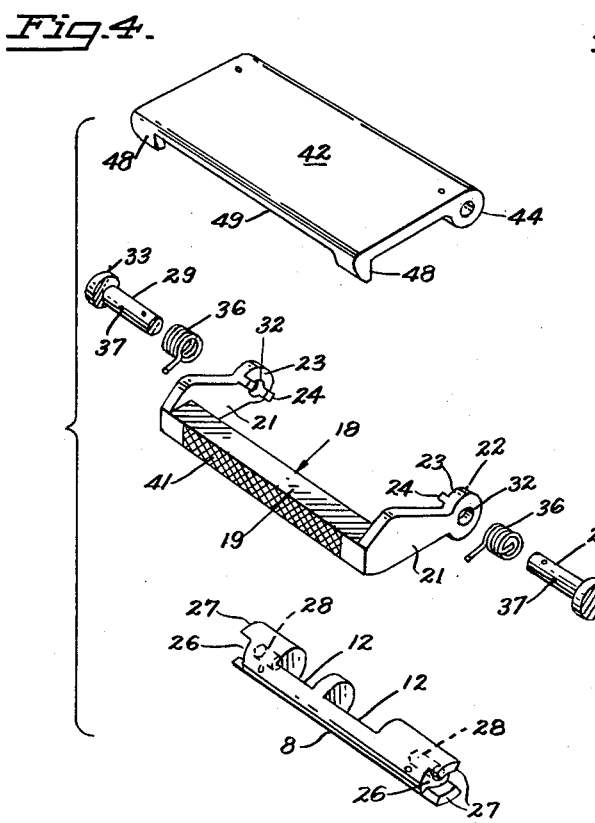
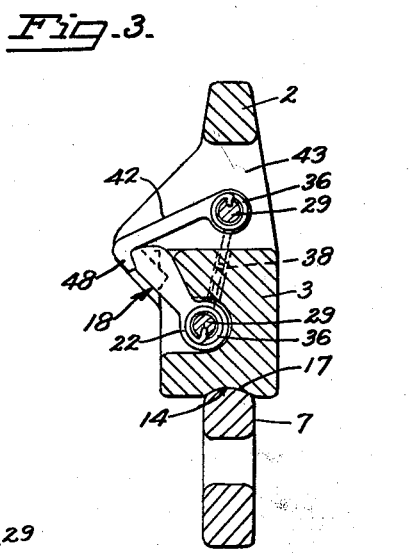
INVENTOR.
JOHN A. GAYLORD
BY
ATTORNEY May 18, 1965 J. A. GAYLORD 3,183,568
CANOPY RELEASE
Filed Sept. 17, 1962 3 Sheets-Sheet 2
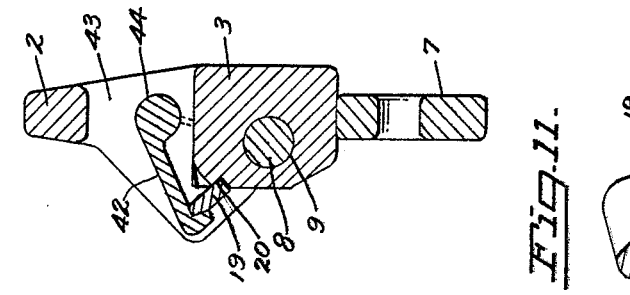
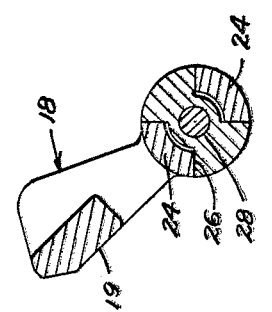
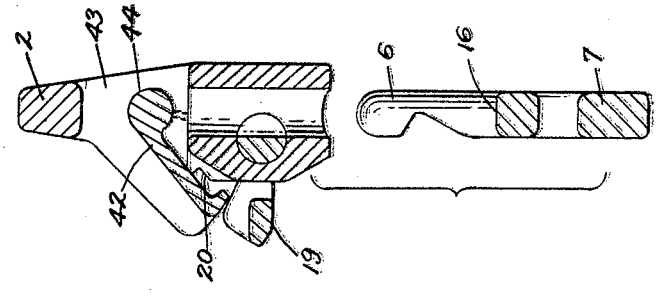
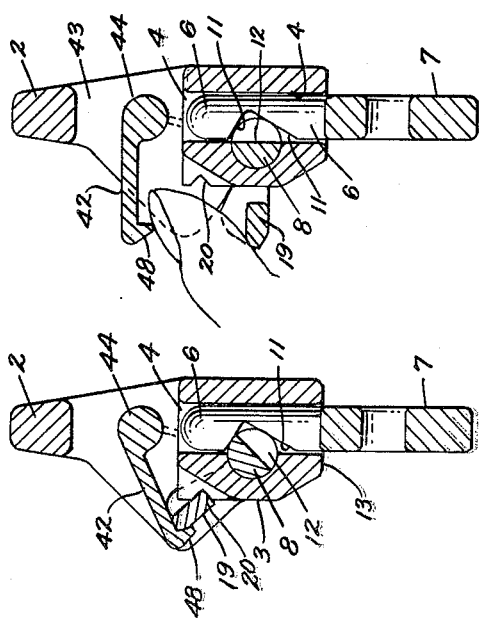
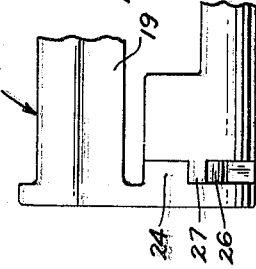
INVENTOR.
JOHN A. GAYLORD
BY George B. White
ATTORNEY May 18, 1965   J. A. GAYLORD   3,183,568
CANOPY RELEASE
Filed Sept. 17, 1962   3 Sheets-Sheet 3
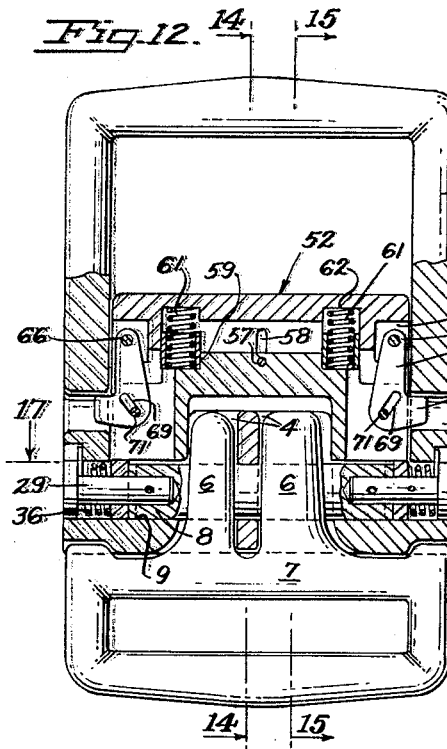
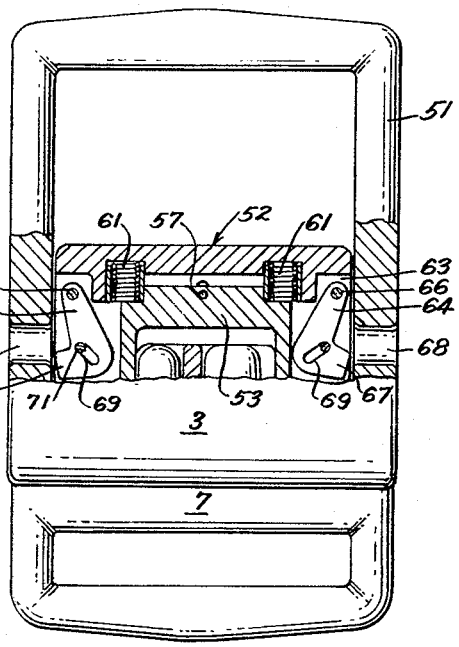
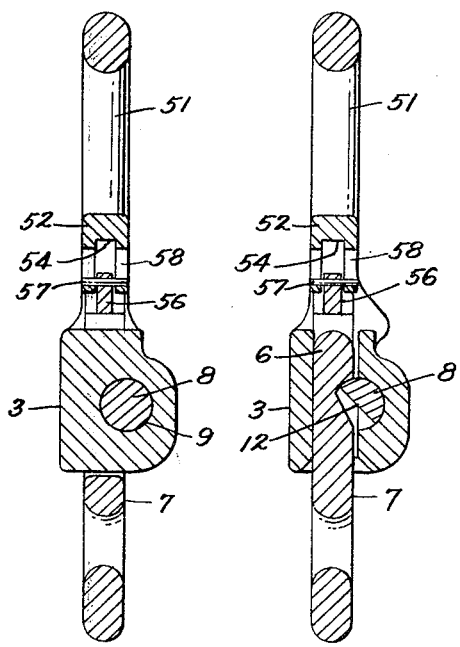
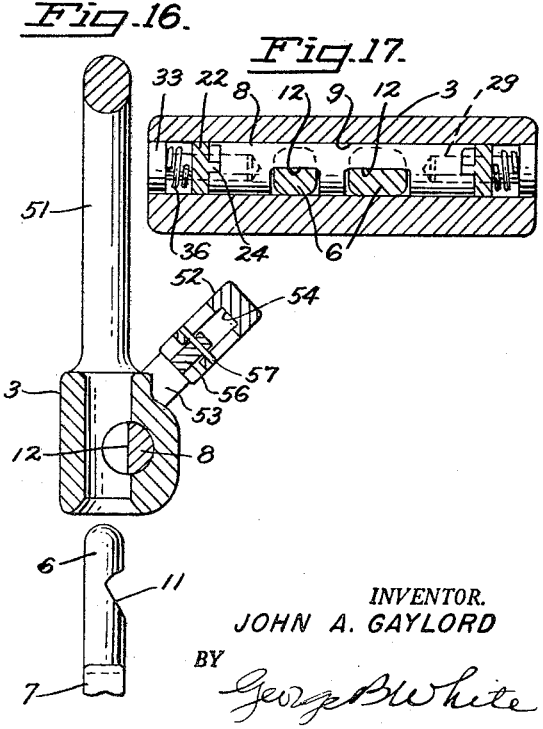
INVENTOR.
JOHN A. GAYLORD
BY
George B White
ATTORNEY United States Patent Office 3,183,568
Patented May 18, 1965

3,183,568
CANOPY RELEASE
John A. Gaylord, San Rafael, Calif., assignor to H. Koch & Sons, Corte Madera, Calif., a corporation of California
Filed Sept. 17, 1962, Ser. No. 224,102
12 Claims. (Cl. 24—230)

This invention relates to a canopy release.

The primary object of this invention is to provide a connector for the straps of a canopy or parachute which can be easily coupled or quickly released and which is firmly locked in operative position.

Another object of the invention is to provide a canopy release in which the accidental release of the canopy straps is positively obviated.

Another object of the invention is to provide a canopy release wherein the prongs of a male connector on a strap are positively locked in position in a female strap connector until a cross shaft is turned in the female connector into an out of the way position for releasing the prongs; means being provided for holding the cross shaft in locking position and to prevent its accidental turning.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention wherein:

FIG. 1 is a front view of the canopy release showing the male connector loop engaged.

FIG. 2 is a partly sectional view of the assembled connectors.

FIG. 3 is a cross-sectional view of the assembled connectors.

FIG. 4 is an exploded view of the movable parts of the female connector.

FIG. 5 is a cross-sectional view of the connector, the section being taken on lines 5—5 of FIG. 2.

FIG. 6 is a cross-sectional view on the same lines as FIG. 5 but showing the manipulation of the connector for turning the shaft into releasing position.

FIG. 7 is a cross-sectional view showing the connector elements separated and freed from one another.

FIG. 8 is a cross-sectional view taken on lines 8—8 of FIG. 1.

FIG. 9 is a fragmental detail view of the female connector on an enlarged scale showing the connection of the releasing lever arm to the cross shaft.

FIG. 10 is a partly cross-sectional view, on an enlarged scale, showing the connection of the hub of the releasing lever arm to the shaft.

FIG. 11 is a cross-sectional view of a modified form of connection between the lever arms of the hub and shaft.

FIG. 12 is a partly sectional view of a modified form of the mechanism for the manipulation of the canopy release.

FIG. 13 is another partly sectional view showing the manipulating mechanism of FIG. 12 ready for turning into releasing position.

FIG. 14 is a cross-sectional view of the said last modified form of the release taken on the lines 14—14 of FIG. 12.

FIG. 15 is a cross-sectional view of the said modified form of the canopy release taken on lines 15—15 of FIG. 12.

FIG. 16 is another cross-sectional view on the same lines as FIG. 15 showing the manipulating lever turning the shaft into releasing position.

FIG. 17 is a sectional view taken on lines 17—17 of FIG. 12 to show the connection of the releasing lever with the shaft.

In the form of the invention shown on FIGS. 1 to 10, a frame 1 has an end 2 which is adapted to be engaged by a loop of a strap not shown. The other end of the frame 1 has an enlarged body 3 provided with a pair of pockets 4 in its bottom. These pockets 4 are keepers to receive prongs 6 of a male connector or ring 7, which latter is in turn suitably connected to another canopy strap. The prongs 6 fit into the respective pockets 4 in the manner shown in FIG. 2 and FIGS. 5 to 8 inclusive.

A cross shaft 8 is journalled in a transverse bearing hole or passage 9 which latter extends from one side of the body 3 to the other side. The shaft 8 has a portion thereof opposite the respective prongs 6 cut away. The passage or hole 9 for the shaft is so formed that the passage 9 intersects the pockets 4 so that one half of the cross-sectional area of the shaft 8 projects into the pockets 4. The respective prongs 6 have recesses 11 therein facing toward the shaft 8 so as to be engaged by the shaft 8 and thus be prevented from being withdrawn from the pockets 4. When the shaft 8 is turned so that the respective cut-away portions 12 of the shaft face the pockets 4, then the pockets 4 are unobstructed by the shaft 8 and the prongs 6 can be withdrawn.

The cut-away portions 12 on the shaft 8 are spaced correspondingly to the spacing of the pockets 4, or the cut-away portion 12 may extend the length of the shaft along all cut-away portions.

In order to assure constant alignment and registering of the ring loop 7 with the straps and with the canopy release, the prongs 6 are of different configurations, in this illustration of different thicknesses as particularly shown in FIG. 12, and the pockets 4 are correspondingly of different size and shape to conform to the respective prongs 6. Therefore the prongs 6 can be inserted into the pockets 4 only in one predetermined relative position of the ring 7.

In order to further assure alignment and prevent accidental disengagement and render both the alignment and the securing firmer and more accurate, each corner of the bottom 13 of the body 3 is cut away to form an aligning recess 14. The top edge or shoulder 16 of the ring 7 beyond the respective prongs 6 is provided with projections 17 which fit into the aligning recesses 14 in the manner shown in FIG. 12, when the prongs 6 are in locked position. The top shoulder 16 of the ring 7 is so spaced from the tips of the prongs 6 that it abuts the bottom 13 of the body 3 whenever the prongs 6 are in properly locked position in the pockets 4.

The cross shaft 8 is rocked by means of yoke lever 18. This yoke lever 18 has a handle bar 19 at each end of which is a lever arm 21. Each lever arm 21 terminates in a hub 22. From the inner face 23 of each hub 22 project a pair of teeth 24, as shown in detail in FIG. 4. These teeth 24 fit into slots 26 in the respective ends of the cross shaft 8. There are two such diametrically opposite slots 26 separated by ribs 27. This permits play of the teeth 24 in the slots 26 in one direction. When the yoke 18 is turned in a contra-clockwise direction viewing FIG. 5 and FIG. 10, and particularly as shown in FIG. 6, then the teeth 24 abut the respective ribs 27 and turn the cross shaft 8 also in a contra-clockwise direction into the position shown in FIG. 6, thereby turning the cut out portions 12 of the shaft 8 to face the pockets 4 and permit the withdrawal of the prongs 6 in the manner shown in FIG. 7.

In each end of the cross shaft 8 there is a hole 28. Into this hole is secured a pin 29 by means of a cross pin 31 or the like. Each pin 29 also extends through a bearing hole 32 in the adjacent hub 22 so that the respective lever arm 21 is journalled on the pin 29. Each pin 29 has a head 33 on its outer end and is of such length that the head 32 is flush with the adjacent side edge 34 of the body 3 as shown in FIG. 2. The cross shaft 8 is shorter than the length of the passage 9 so as to accommodate the hub 22 of the yoke and leave a space between the hub 22 and the head 33. A coil spring 36 is positioned between the hub 22 and the head 33. One end of the coil spring is anchored in a hole 37 in the adjacent pin 29 and the other end of the coil spring 36 is anchored in a suitable groove 38 in the adjacent wall of the body so as to urge the shaft 8 to turn in a clockwise direction viewing FIG. 6 and FIG. 10. This groove 38 is cut in the respective side edges 34 of the body 3.

After the yoke lever 18 is turned from the position shown in FIG. 5 to the position shown in FIG. 6 to release the prongs 6, and then released, the springs 36 turn the shaft 8 in a clockwise direction viewing FIG. 6 and FIG. 10 and by the engagement of the ribs 27 with the teeth 24 turn the shaft 8 as well as the yoke lever 18 back into the initial position shown in FIG. 8.

The body 3 has a pair of deep cavities 39 extended from the passage 9 to the front or the operating face, of the body 3 as shown in FIG. 3, to accommodate the respective lever arms 21 for the aforedescribed motion of the yoke 18 for turning the shaft 8 in opposite directions. The handle bar 19 in the locked position rests in a pair of seats 20 formed on the body 3.

The outer edge of the handle bar 19 is preferably a flat edge 41 as shown in FIG. 4 and it is serrated to afford positive frictional engagement or grip for the finger or thumb of the operator.

A locking flap 42 is positioned in the space 43 above the body 3. This flap 42 has a hub 44 which extends between the opposite sides of the space 43 of the frame 1. In each side wall 45 of the recess 43 is a hole 46 which accommodates a pin 29 with a head 33, of the type heretofore described in connection with the cross shaft 8. The coil spring 36 is anchored at one end in said groove 38 and its other end on the pin 29 as heretofore described. The inner end of each pin 29 extends into the hub 44 of the flap 42 as shown in FIG. 2 and is anchored therein by a suitable cross pin 47 so that the coil springs 36 in this instance tend to turn the flap 42 in a contraclockwise direction viewing FIG. 6 and FIG. 7.

The outer or free edge of the flap 42 is provided with a pair of projections or flanges 48 which latter overlap the handle bar 19 to lock it in position. These flanges 48 are also aligned with the respective lever arms 21 and abut against the respective lever arms 21 as shown in FIG. 7 to hold the yoke 18 in open or releasing position. In order to again bring the cross shaft 8 into locking position the operator first engages the recessed edge 49 of the flap 42 and lifts it up whereupon the action of the lower coil springs 36 will turn the cross shaft 8 and the yoke lever 18 into the locking position shown in FIG. 5, then the flap 42 will be turned by the upper coil springs 36 so that its projecting flanges 48 overlap the outside of the edge 41 of the finger bar 19 as shown in FIG. 3 and FIG. 5, and hold the yoke lever 18 in locking position. In order to release the canopy the operator must first raise the flap 42 before it can pull out the serrated edge 41 of the finger bar 19 to turn the yoke 18 outwardly for releasing the prongs 6.

The prongs 6 can be inserted, in this embodiment, without turning the yoke lever 18 because as the prongs 6 are pushed into the pockets 4 the rounded tips of the prongs 6 engage the cut-away edge or flat cut-away face or side of the shaft which is facing downwardly as shown in FIG. 5 and push the flat side so as to turn the shaft in a contra-clockwise direction viewing FIG. 5 from the position shown in FIG. 5 to the position shown in FIG. 6. Due to the position of the ribs 27, as shown in FIG. 10, sufficient contra-clockwise play is allowed for the shaft 8 to permit its turning independently of the yoke lever 18 to permit the insertion of the prongs 6. After the recesses 11 of the prongs 6 are aligned with the passage 9 then the lower coil springs 36 snap the shaft 8 clockwise back to the locking position.

In the modified form shown in FIG. 11 the slots 26 in the ends of the shaft 8 are only of such width as to accommodate the teeth 24 without any play, consequently in this form the yoke lever 18 must be kept open by the flap 42 in order to permit insertion of the prongs 6 into the pocket 4. In other respects this form operates as the first embodiment of the invention heretofore described.

In the modified form shown in FIGS. 12 to 16 inclusive the manipulating lever is different, but the actual locking mechanism and coaction between the prongs 6 and the cross shaft 8 are the same as in the previously described forms. In this modified form the upper portion 51 of the frame 1 is elongated to provide space for a cross head 52 on the yoke lever 53. The cross head 52 has a groove 54 in its lower edge to slidably straddle the top cross bar 56 of the yoke lever 53. A cross pin 57 extends transversely to the cross bar 56 and into slots 58 as particularly shown in FIGS. 14 to 16. These slots 58 are elongated to permit the relative movement of the cross head 52. On each end of the cross bar 56 is formed a shoulder 59 on which rests a coil spring 61. Each coil spring 61 is nested in a pocket 62 in the bottom of the groove 54 of the cross head 52. These coils springs 61 normally urge the cross head 52 upwardly into the position shown in FIG. 12.

In each end of the cross head 52 is another pocket 63 to accommodate the end of a bellcrank or dog 64. This dog 64 is pivoted on a pin 66 transverse with respect to the head 52 so that the dog 64 can swing toward to and away from the adjacent side of the upper frame 51. Each dog 64 has an engagement head 67 at an outward angle projecting into a keeper hole 68 in the adjacent side of the frame 51 as shown in FIG. 12. When the dogs 64 are in the position shown in FIG. 12 they lock the cross head 52 and thus lock the yoke lever 53 to prevent the turning of the cross shaft 8 for releasing the prongs 6.

Each dog 64 has an elongated slot 69 therein which slot is at approximately 45° angle relatively to the pivot 66 and is inclined upwardly and toward the adjacent side of the frame 51 as shown in FIG. 12. A guide pin 71 extends from the body of the yoke lever 53 into the slot 69 so that when the cross head 52 is depressed against the action of the coil springs 61, the downward movement of the dogs 64 causes the slots 69 to ride on the fixed pins 71 into the position shown in FIG. 13 thereby withdrawing the dog head 67 from the holes 68 and permitting the swinging of the yoke lever 53 from the position shown in FIG. 15 into the position shown in FIG. 16, thereby turning the cross shaft 8 to release the prongs 6 in the manner heretofore described. In this modified embodiment the manipulation is by first depressing the cross head 52 and then by turning the cross head 52 and the yoke lever 53 while the cross head 52 is held depressed. Then to return to the initial locking position, the cross head 52 is again depressed so that the heads 67 of the dogs 64 clear the sides of the frame 51 and the yoke lever 53 is turned back into the initial position in the upper frame 51 as shown in FIG. 15. Then finally again releasing the cross head 52 the springs 61 will push the cross head 52 upwardly and thereby move the dogs 64 from the position shown in FIG. 13 into the position shown in FIG. 12 with the heads 67 in the holes 68 for locking the yoke lever 53 and the shaft 8 in the release locking position.

In operation positive locking is accomplished and accidental release of the canopy or the separation of the straps is prevented because until the cross shaft 8 is turned so as to clear the passage 9 through the pocket 4, the prongs 6 are positively prevented from removal from said pockets 4. Accidental manipulation in the first embodiment is also prevented by the locking flap 42 which overlaps and locks the yoke lever 18 and its lever arms 21 in shaft locking position so that before the prongs 6 can be released first the locking flap 42 must be raised as shown in FIG. 6 and then by the same continuous manipulation the handle bar 19 is pulled out so as to turn the yoke lever 18 outwardly and thereby turn the cross shaft 8 into out of the way position to permit release of the prongs 6.

I claim:
1. A canopy release comprising:
   (a) a female strap connector frame,
   (b) a male strap connector frame,
   (c) keeper pockets in the female frame,
   (d) connector prongs extended from the male frame and fitting into said keeper pockets,
   (e) a rocking shaft journalled in said female connector frame and intersecting said keeper pockets,
   (f) portions of said shaft registering with said keeper pockets being recessed to permit the insertion and removal of said prongs,
   (g) portions of said prongs registering with said pockets being recessed to be engaged by said shaft when said shaft is turned to move the recessed shaft portions out of said pockets and the unrecessed portions of the shaft into said pockets for interlocking with the recessed portions of said prongs,
   (h) the said connector prongs being of different configuration and said keeper pockets and said shaft recesses being correspondingly of different configurations so as to pre-determine the position of the insertion of the connector prongs so that the recesses in said recessed portions of said connector prongs face the rocking shaft for engagement by said rocking shaft,
   (i) manipulable means for rocking said rocking shaft to disengage the shaft from the recesses in said prongs,
   (j) said manipulable means including a handle bar generally parallel with said rocking shaft,
   (k) arms extended from said handle bar and connected to said shaft for rocking said shaft as the handle bar is moved relatively to said female strap connector frame,
   (l) releasable means engageable with said handle bar to hold said handle bar in an initial position interlocking said shaft with said connector prongs.

2. The canopy release defined in claim 1, and
   (m) resiliently yieldable means to normally turn said shaft into said initial interlocking position.

3. A canopy release as defined in claim 1, and said releasable means for locking said handle bar comprising:
   (a) a flap pivoted on said female connector frame,
   (b) flanges on said flap engageable with said handle bar for holding said handle bar locked,
   (c) said flanges abutting said lever arms in the unlocking position of said handle bar to prevent movement of said handle bar into shaft locking position.

4. A canopy release as defined in claim 1, said releasable means for locking said handle bar comprising:
   (a) a cross head on said handle bar,
   (b) means to hold said cross head slidably on said handle bar,
   (c) engagement dogs pivoted on said cross head,
   (d) said female connector frame having keeper recesses therein engaged by the respective dogs,
   (e) resilient means to urge said cross head into an initial position wherein said dogs are engaged with said recesses for locking said handle bar in shaft interlocking position,
   (f) and means to guide said dogs so as to withdraw said dogs from said recesses when said cross head is moved on said handle bar against the action of said resilient means for unlocking said handle bar.

5. The canopy release defined in claim 1, said releasable means including:
   (a) a cross head on said manipulating means,
   (b) means movably to hold said cross head on said manipulable means,
   (c) dogs pivoted on said cross head,
   (d) said female connector frame having keeper elements to receive said dogs so as to lock said cross bar and said manipulating means to said female connector frame,
   (e) resilient means to hold said cross head in an initial position where said dogs are interlocked with said keeper elements,
   (f) and guide means for said dogs to withdraw said dogs from said keeper elements when said cross head is moved against the action of said resilient means and to move said dogs to said keeper elements when said cross head is returned by said resilient means to its initial position.

6. A canopy release comprising:
   (a) a female strap connector frame,
   (b) a male strap connector frame,
   (c) keeper pockets in the female frame,
   (d) connector prongs extended from the male connector frame and fitting into said keeper pockets in a predetermined position,
   (e) a rocking shaft journalled in said female connector frame and intersecting said keeper pockets,
   (f) portions of said shaft registering with said keeper pockets being recessed to permit the insertion and removal of said prongs,
   (g) portions of said prongs registering with said pockets being recessed to be engaged by said shaft when said shaft is turned to move the recessed portions of the shaft out of said pockets thereby to lock said prongs in said pockets,
   (h) a lever arm connected to each end of said shaft and extended beyond one side of said female connector frame,
   (i) a first manipulable cross member along said one side of said female connector frame connecting said lever arms for turning said shaft,
   (j) first resilient means normally to urge said cross member and said lever arms into shaft locking position,
   (k) a second manipulable cross member along said one side of and being journalled on said female connector frame and being engageable with said cross-bar and said lever arms to restrain movement of the same,
   (l) second resilient means normally to urge said second manipulable cross member into said engaging position thereby to prevent freeing of said first manipulable member until said second manipulable member is raised against the action of said second resilient means.

7. The canopy release defined in claim 6, and
   (m) means on said second manipulable cross member to abut and hold said first manipulable cross member selectively in locking and unlocking attitudes of said first manipulable cross member.

8. The canopy release defined in claim 6, and
   (a) said male connector frame having two prongs extended therefrom, the said recess on each prong facing in the direction of said shaft,
   (b) one of said prongs being of different configuration than the other and said keeper pockets and said recessed portions of said shaft conforming to the respective configurations of said prongs thereby to align said recesses of said prongs with said shaft.

9. The canopy release defined in claim 6, the connection between said lever arms and each end of the shaft being
   (m) spaced connecting teeth on each lever arm, (n) and said shaft having spaced slots interfitting with said teeth for transmitting rocking motion from said first manipulable cross member to said shaft.

10. In a canopy release
(a) a female strap connector frame,
(b) a male trap connector frame,
(c) a body of said female strap connector frame having at least one keeper pocket therein,
(d) a shaft journalled transversely in said body intersecting said keeper pocket,
(e) a cut-away portion on said shaft forming a shaft recess in registry with said keeper pocket,
(f) a connector prong on said male connector frame fitting into said keeper pocket and into said shaft recess,
(g) said connector prong having a keeper recess therein in registry with said shaft recess to interlock with said shaft when said shaft is rocked to turn said shaft recess away from said keeper recess,
(h) a lever arm connected to each end of said shaft,
(i) a handle bar parallel with the shaft connecting said lever arms for rocking said shaft,
(j) resilient means on said female connecting frame normally to turn said shaft into interlocking position with said prong,
(k) a flap pivoted on said female connecting frame parallel with and overlapping said handle bar to hold said handle bar in shaft interlocking position,
(l) resilient means on said female connecting frame normally to turn said flap into said overlapping position.

11. In a canopy release as defined in claim 10,
(m) abutments on said flap engageable with said lever arms in the unlocking position of said handle bar for holding said shaft out of prong interlocking position.

12. In a canopy release
(a) a female strap connector frame,
(b) a male strap connector frame,
(c) a body of said female strap connector frame having at least one keeper pocket therein,
(d) said female connector frame being adapted to be connected to a canopy strap,
(e) a connector prong on said male connector frame fitting into said keeper pocket,
(f) said male connector frame being adapted to be connected to another strap,
(g) said connector prong having a keeper recess therein,
(h) a shaft journalled transversely in said body intersecting said keeper pocket,
(i) a cut-away portion on said shaft registering with said keeper recess,
(j) a face on the shaft at said cut-away portion projecting into said keeper recess so as to interlock said shaft and said prong and being withdrawable from said recess by the turning of said shaft,
(k) manipulating means connected to said shaft for rocking said shaft so as to turn said face out of said recess thereby to free said prong from said pocket,
(l) and resiliently yieldable means in said body normally to urge said shaft to interlock with said prong,
(m) said manipulating means including a handle bar,
(n) lever arms extended from the handle bar to the shaft,
(o) and means to connect said lever arms to said shaft, said connecting means including,
(p) spaced connecting teeth on said lever arms,
(q) and said shaft having spaced slots interfitting with said teeth for transmitting rocking motion from said handle to said shaft,
(r) said slots being wider than said teeth and so related as to permit rocking of said shaft independently of said lever arms against the action of said resiliently yieldable means when said prong is inserted into said keeper pocket.

References Cited by the Examiner
UNITED STATES PATENTS

| | | | |
|---|---|---|---|
| 854,196 | 5/07 | Brown | 24—230.1 |
| 1,754,959 | 4/30 | Matushenko | 24—201.4 |
| 2,916,786 | 12/59 | Legat | 24—230.1 |
| 3,034,596 | 5/62 | Twaits | 24—205.17 |
| 3,078,538 | 2/63 | Brown | 24—230.1 |

FOREIGN PATENTS

| | | |
|---|---|---|
| 781,228 | 5/35 | France. |
| 1,108,498 | 1/56 | France. |
| 161,149 | 6/05 | Germany. |
| 877,207 | 9/61 | Great Britain. |
| 128,303 | 10/28 | Switzerland. |

DONLEY J. STOCKING, *Primary Examiner.*
BERNARD A. GELAK, *Examiner.*